United States Patent Office 2,868,809
Patented Jan. 13, 1959

2,868,809

19-NORTESTOSTERONE PHENYL ALKANOATES

Robert A. Donia, Kalamazoo Township, Kalamazoo County, and Arnold C. Ott, Kalamazoo, Mich., assignors to The Upjohn Company, Kalamazoo, Mich., a corporation of Michigan No Drawing. Application August 12, 1954
Serial No. 449,502

7 Claims. (Cl. 260—397.4)

The present invention pertains to steroid compounds related to testosterone and is more particularly concerned with novel 19-nortestosterone 17-phenylalkanoates wherein the alkanoate biradical contains from two to three carbon atoms, inclusive, and the 3-enol acylates thereof wherein an acylate radical is of the formula AcO, Ac being the acyl radical of a hydrocarbon monocarboxylic acid containing from two to nine carbon atoms, inclusive.

This application is a continuation-in-part of our copending application Serial No. 349,096, filed April 15, 1953.

In the present invention, the 19-nortestosterone 17-phenylalkanoates may be represented by the formula:

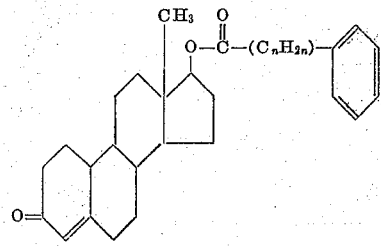

wherein $n$ is an integer from one to two, inclusive, and the 3-enol acylates thereof may be represented by the formula:

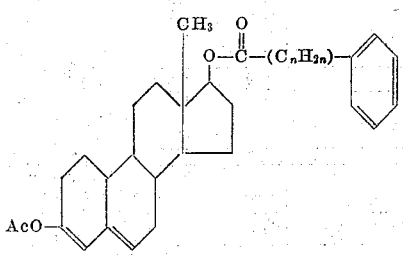

wherein $n$ is an integer from one to two, inclusive, and AcO is an acylate group, Ac being the acyl radical of a hydrocarbon monocarboxylic acid containing from two to nine carbon atoms, inclusive.

It is an object of this invention to provide novel 19-nortestosterone 17-phenylalkanoates and 3-enol acylates thereof of the above formulas, which have very high anabolic activity and an exceedingly high ratio of anabolic activity to androgenic activity. Therefore the compounds of the present invention are useful as anabolic agents of high potency having very little androgenic side effects. Other objects and uses will be apparent to one skilled in the art.

It has been shown in our copending application Serial No. 349,096, now Patent No. 2,798,879, issued July 9, 1957, that certain 19-nortestosterone 17-acylates and 3-enol acylates thereof are compounds having high and prolonged anabolic activity and a high ratio of anabolic activity to androgenic activity (e. g., A–C, Table I). Now it has been found that the 19-nortestosterone 17-phenyl-alkanoates and 3-enol acylates thereof of the present invention are markedly superior to other 19-nortestosterone 17-acylates and 3-enol acylates thereof (e. g., D, Table I), and also to testosterone 17-phenylacetate (E, Table I). For example, 19-nortestosterone 17-phenylacetate has markedly greater anabolic activity than the other 19-nortestosterone esters in Table I, and it has about ten times the anabolic activity of testosterone 17-phenylacetate. Likewise the ratio of anabolic activity to androgenic activity of 19-nortestosterone 17-phenylacetate is almost twice that of the most active other 19-nortestosterone acylate, and its ratio is more than 18 times that of testosterone 17-phenylacetate. Moreover, the amount of 19-nortestosterone 17-phenylacetate required to obtain a particular anabolic effect is considerably less than that of other 19-nortestosterone esters, and to obtain an equal anabolic effect with testosterone 17-phenylacetate more than eight times the amount is required.

TABLE I

| Test Compound 19-Nor-testosterone 17-acylate | Potency Ratio of Test Compound to Testosterone Propionate | | Ratio of Anabolic to Androgenic Activity | Relative Weights of Test Compounds Producing Equal Anabolic Effects |
|---|---|---|---|---|
| | Androgenic Activity | Anabolic Activity | | |
| A. 17-propionate | 0.4 | 2.6 | 6.3 | 0.4 |
| B. 17-(β-cyclopentylpropionate) | 0.2 | 2.1 | 9.6 | 0.5 |
| C. 17-trimethylacetate | 0.02 | 0.2 | 9.0 | 5.5 |
| D. 17-phenylacetate | 0.2 | 3.7 | 18.5 | 0.3 |
| E. Testrosterone 17-phenylacetate | 0.4 | 0.4 | 1.0 | 2.5 |
| F. Testosterone propionate (Standard) | 1.0 | 1.0 | 1.0 | 1.0 |

In Table I, "Potency ratio of test compound to testosterone propionate" was determined by the method of Irwin [Supplements to the Journal of the Royal Statistical Society, vol. IV, No. 1, page 1 (1937)] from dose-response curves, using one curve for each type of activity of each test compound, the amount of activity, or response, being plotted against the amount, or dose, of test compound used for each of several dosage levels. The experimental data used for plotting the dose-response curves was obtained by administering the test compounds in equal daily doses, each contained in 0.1 milliliter of cottonseed oil, subcutaneously to rats, castrated at a body weight of 40 to 45 grams, for 21 days beginning on the day following castration, using at least five rats for each dosage level of each compound; and, at autopsy on the day following the last injection, determining the body weight; seminal vesicle weight, and levator ani muscle weight; the weight of the seminal vesicle per 100 grams of body weight being used as an index of androgenic activity, and the weight of the levator ani muscle per 100 grams of body weight being used as an index of anabolic activity.

The 19-nortestosterone 17-phenylalkanoates and 3-enol acylates thereof of the present invention are prepared by acylation of 19-nortestosterone using an acylating agent such as, for example, an acid, acid anhydride, acid halide, ester of an acid with a lower alcohol, a ketene, etc., to convert the alcoholic hydroxy group to an ester and, when desired, the ketone group to an enol ester. In general a basic catalyst is employed to obtain 17-acylation, while an acid catalyst is normally used to obtain 3-enol acylation, or 3-enol acylation and 17-acylation. The 19-nortestosterone 17-phenylalkanoates also are obtained by partial hydrolysis of the 3-enol acylates of 19-nortestosterone 17-phenylalkanoates.

The following examples are illustrative of the processes and products of the present invention, but are not to be construed as limiting.

*Example 1.—19-nortestosterone 17-phenylacetate*

An ice-cold solution of 1.5 grams of 19-nortestosterone and 1.5 milliliters of dry pyridine in ten milliliters of dry benzene is prepared and a solution of phenylacetyl chloride (0.9 milliliter) in five milliliters of dry benzene is added dropwise over a period of about two minutes with stirring. The resulting mixture is allowed to stand overnight under an atmosphere of nitrogen and then washed successively with cold 5 percent aqueous hydrochloric acid solution, cold 2.5 percent aqueous sodium hydroxide solution, and water. After drying over anhydrous sodium sulfate, the solvent is evaporated to give an almost colorless oil (1.95 grams). Recrystallization from petroleum ether (boiling at 30 to 60 degrees centigrade) gives white crystals of 19-nortestosterone 17-phenylacetate, melting point 72 to 76 degrees centigrade.

Analysis.—Calculated for $C_{26}H_{32}O_3$: C, 79.55; H, 8.22. Found: C, 79.74; H, 8.52.

Heating the 19-nortestosterone 17-phenylacetate under reflux with phenylacetyl chloride and a catalytic amount of paratoluenesulfonic acid, using toluene as a solvent, for a period of several hours, cooling and diluting the resulting solution with cold water, and filtering the solid obtained, provides the 3-enol phenylacetate of 19-nortestosterone 17- phenylacetate. 19-nortestosterone is converted to the 3-enol phenylacetate of 19-nortestosterone 17-phenylacetate in one step by using 19-nortestosterone in place of its 17-phenylacetate ester in the preceding process. Other 3-enol acylates of 17-nortestosterone 17-phenylacetate such as, for example, the acetate, propionate, trimethylacetate, β-cyclopentylpropionate, and the like, are obtained in the same manner by reacting 19-nortestosterone phenylacetate with the appropriate acylating agent. Partial hydrolysis of 3-enol acylates of 19-nortestosterone 17-phenylacetate provides 19-nortestosterone 17-phenylacetate. Complete hydrolysis of said compound produces 19-nortestosterone in purified form.

*Example 2.—19-nortestosterone 17-(β-phenylpropionate)*

A solution of 2.5 grams of 19-nortestosterone and 2.5 milliliters of dry pyridine in ten milliliters of dry benzene is prepared and, following the procedure of Example 1, 1.5 milliliters of β-phenylpropionyl chloride in five milliliters of dry benzene is added dropwise. The reaction is conducted as in Example 1, and the oil obtained is crystallized from methanol to give 19-nortestosterone 17-(β-phenylpropionate), melting point 91 to 92.5 degrees centigrade.

19-nortestosterone 17-(β-phenylpropionate) is converted to a 3-enol acylate such as, for example, the 3-enol acetate, or the 3-enol β-cyclopentylpropionate, in the same manner as shown for the preparation of the 3-enol acylate of 19-nortestosterone 17-phenylacetate in Example 1. Other 3-enol acylates of 19-nortestosterone 17-(β-phenylpropionate) include the 3-enol propionate, formate, butyrate, isobutyrate, pentanoate, hexanoate, heptanoate, octanoate, β-phenylpropionate, and like 3-enol acylates.

*Example 3.—19-nortestosterone 17-(α-phenylpropionate)*

By reaction of 19-nortestosterone and α-phenylpropionyl chloride, following the method of Example 1, 19-nortestosterone 17-(α-phenylpropionate) is produced. 3-enol acylates of 19-nortestosterone 17-(α-phenylpropionate), prepared as in Examples 1 and 2, include the 3-enol propionate, acetate, benzoate, phenylacetate, and like 3-enol acylates of 19-nortestosterone 17-(α-phenylpropionate). Partial hydrolysis of these compounds provide 19-nortestosterone 17-(α-phenylpropionate).

Table II gives melting points, analytical data, and the acylating agent employed, of other 19-nortestosterone 17-acylates, and 3-enol acylates thereof, prepared according to the procedures of Examples 1 through 3.

TABLE II

| 17-Acylate of 19-Nortestosterone | M. P. (° C.) | Analysis Calc'd | Analysis Found | Acylating Agent |
|---|---|---|---|---|
| Acetoacetate | waxy solid | C:73.71<br>H: 8.44 | 73.47<br>8.43 | Acid ethyl ester. |
| 10-Hendecenoate | oil | | | acid chloride. |
| Formate | 105–110 | C:75.46<br>H: 8.67 | 75.74<br>8.74 | free acid. |
| Acid glutarate | 165–174 | C:71.10<br>H: 8.30 | 71.51<br>8.53 | acid anhydride. |
| Glutarate | 203–215 | | | Do. |
| i-Butyrate | 87–90 | C:76.70<br>H: 9.36 | 77.81<br>9.70 | acid chloride. |
| i-Valerate | oil | C:77.08<br>H: 9.55 | 77.81<br>9.41 | Do. |
| n-Heptanoate | oil | | | Do. |
| Diphenylacetate | glass | C:82.01<br>H: 7.74 | 81.95<br>7.75 | Do. |
| Stearate | 49–54 | C:79.60<br>H:11.37 | 79.86<br>11.48 | Do. |
| Ethoxyacetate | 75–85 | | | Do. |
| p-Trifluoro-acetamido-phenylacetate | 178–185 | | | free acid (and trifluoroacetic anhydride). |
| Chloroformate | 70–85 | C:67.74<br>H: 7.48<br>Cl:10.53 | 67.96<br>7.81<br>10.17 | phosgene. |
| p-Nitrophenylacetate | glass | | | acid chloride. |
| Trifluoroacetate | 75–82 | | | acid anhydride. |
| Propionate, 3-enol propionate | 112–116 | C:74.58<br>H: 8.87 | 74.76<br>8.65 | acid anhydride and p-toluene-sulfonic acid). |
| Butyrate, 3-enol butyrate | | | | acid chloride. |

It is to be understood that the invention is not to be limited to the exact details of operation or exact compounds shown and described, as obvious modifications and equivalents will be apparent to one skilled in the art and the invention is therefore to be limited only by the scope of the appended claims.

We claim:

1. A compound selected from the group consisting of 19-nortestosterone 17-phenylalkanoate wherein the alkanoate biradical contains from two to three carbon atoms, inclusive, and the 3-enol acylate thereof wherein an acylate radical is of the formula AcO, Ac being the acyl radical of a hydrocarbon monocarboxylic acid containing from two to nine carbon atoms, inclusive.

2. 19-nortestosterone 17-phenylalkanoate wherein the alkanoate biradical contains from two to three carbon atoms, inclusive.

3. 19-nortestosterone 17-phenylalkanoate 3-enol acylate wherein the alkanoate biradical contains from two to three carbon atoms, inclusive, and wherein an acylate radical is of the formula AcO, Ac being the acyl radical of a hydrocarbon monocarboxylic acid containing from two to nine carbon atoms, inclusive.

4. 19-nortestosterone 17-phenylacetate.
5. 19-nortestosterone 17-phenylpropionate.
6. 19-nortestosterone 17-($\alpha$-phenylpropionate).
7. 19-nortestosterone (17-($\beta$-phenylpropionate).

References Cited in the file of this patent
UNITED STATES PATENTS
2,698,855   Hicks ------------------ Jan. 4, 1955